US008861629B2

(12) United States Patent
Stager et al.

(10) Patent No.: US 8,861,629 B2
(45) Date of Patent: Oct. 14, 2014

(54) POWER ALLOCATION OF SPATIAL STREAMS IN MIMO WIRELESS COMMUNICATION SYSTEM

(75) Inventors: Paul J. Stager, Akron, OH (US); Gary L. Sugar, Cleveland, OH (US); Matthew A. Silverman, Richfield, OH (US); Zhigang Gao, Richfield, OH (US); Chandra Vaidyanathan, Cleveland, OH (US)

(73) Assignee: Cisco Technology, Inc., San Jose, CA (US)

( * ) Notice: Subject to any disclaimer, the term of this patent is extended or adjusted under 35 U.S.C. 154(b) by 535 days.

(21) Appl. No.: 12/828,574

(22) Filed: Jul. 1, 2010

(65) Prior Publication Data

US 2011/0026630 A1 Feb. 3, 2011

Related U.S. Application Data

(60) Provisional application No. 61/230,170, filed on Jul. 31, 2009.

(51) Int. Cl.
*H04B 7/02* (2006.01)
*H04B 7/04* (2006.01)
*H04B 7/06* (2006.01)
*H04L 27/26* (2006.01)

(52) U.S. Cl.
CPC ............ *H04B 7/0617* (2013.01); *H04B 7/0439* (2013.01); *H04L 27/2601* (2013.01)
USPC .......................................... 375/267; 375/220

(58) Field of Classification Search
CPC .............. H04B 1/40; H04B 3/23; H04B 3/32; H04B 7/0669; H04L 25/0266; H04L 25/03343; H04L 7/0033; H04L 27/2647; H04L 27/368; H04L 5/0007; H04L 1/0618; H04L 1/06; H03F 1/3247
USPC .......... 375/267, 219-220, 260, 285, 296, 299
See application file for complete search history.

(56) References Cited

U.S. PATENT DOCUMENTS

| | | | |
|---|---|---|---|
| 6,687,492 B1 | 2/2004 | Sugar et al. | |
| 6,728,517 B2 | 4/2004 | Sugar et al. | |
| 6,785,520 B2 | 8/2004 | Sugar et al. | |
| 7,031,669 B2 | 4/2006 | Vaidyanathan et al. | |
| 2004/0242162 A1* | 12/2004 | Lau | 455/69 |

(Continued)

OTHER PUBLICATIONS

Chan et al., "Optimal Power Allocation in Zero-Forcing MIMO-OFDM Downlink with Multiuser Diversity", Proceedings 14th IST Mobile Wireless Communication Summit, Jun. 2005.

(Continued)

*Primary Examiner* — Sam K Ahn
*Assistant Examiner* — Janice Tieu
(74) *Attorney, Agent, or Firm* — Edell, Shapiro & Finnan, LLC

(57) ABSTRACT

Multiple-input multiple-output (MIMO) wireless communication techniques are provided that involve mapping multiple spatial streams to corresponding modes of a wireless channel between a plurality of antennas of a first wireless communication device and a plurality of antennas of a second wireless communication device so as to allocate or distribute power unequally to the plurality of modes. In addition, techniques are provided herein to cyclically shift a mapping of spatial streams to modes of the channel.

17 Claims, 5 Drawing Sheets

(56) References Cited

U.S. PATENT DOCUMENTS

2006/0072677 A1* 4/2006 Kwak et al. .................. 375/260
2007/0291640 A1* 12/2007 Zhang et al. ................. 370/210
2009/0046768 A1* 2/2009 Pare, Jr. ...................... 375/220

OTHER PUBLICATIONS

Soysal et al., "Optimum Power Allocation in Fading MIMO Multiple Access Channels with Partial CSI at the Transmitters", Proceedings Asimolator Conference on Signal Systems and Computers; Pacific Grove, CA, Oct. 2006.

* cited by examiner

POWER ALLOCATION OF SPATIAL STREAMS IN MIMO WIRELESS COMMUNICATION SYSTEM

RELATED APPLICATION

This application claims priority to U.S. Provisional Patent Application No. 61/230,170, filed Jul. 31, 2009, the entirety of which is incorporated herein by reference.

TECHNICAL FIELD

The present disclosure relates to multiple-input multiple-output (MIMO) wireless communication systems.

BACKGROUND

In a MIMO wireless communication system, a first device having a plurality of antennas sends multiple spatial stream transmissions to a second device having a plurality of antennas. The allocation of power to the spatial streams affects the performance of the system. Fully equalizing power among the spatial streams does not always provide for best performance. Determining when and how to allocate power from strong beamforming modes to weaker beamforming modes is important in optimizing performance of a MIMO system.

DESCRIPTION OF EXAMPLE EMBODIMENTS

Overview

Techniques are provided herein for mapping multiple spatial streams to corresponding modes of a wireless channel between a plurality of antennas of a first wireless communication device and a plurality of antennas of a second wireless communication device so as to allocate or distribute power unequally to the plurality of modes. In addition, techniques are provided herein to cyclically shift a mapping of spatial streams to modes of the channel.

Example Embodiments

Figure 1:
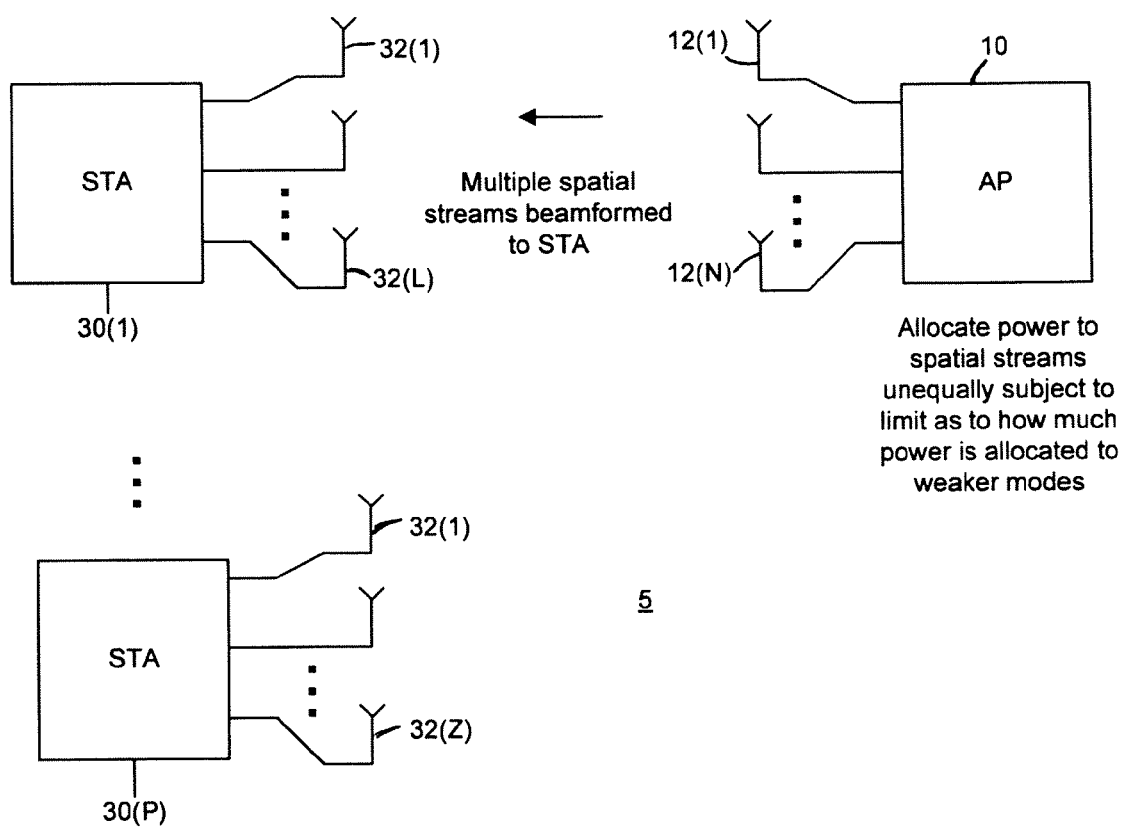
FIG. 1 is an example of a block diagram of a wireless communication system in which a first wireless communication device, e.g., an access point (AP) that performs a power allocation process to distribute power to spatial streams transmitted to a second wireless communication device, e.g., a station (STA).

Referring first to FIG. 1, a multiple-input multiple-output (MIMO) wireless communication system 5 is shown comprising a first wireless communication device 10 and a plurality of second wireless communication device 30(1)-30(P). The first wireless communication device 10 is, for example, a wireless network access point (AP) device and the second wireless communication devices 30(1)-30(P) are wireless network stations (STAs), also referred to herein as client devices. For example, the AP 10 and the STAs 30(1)-30(P) are configured to operate according to the IEEE 802.11n wireless communication protocol standard. This is only an example and they may be configured to operate according to any now known or hereinafter developed wireless communication technology. The AP 10 comprises a plurality of antennas 12(1)-12(N) and each STA may also comprise a plurality of antennas. Each STA need not have the same number of antennas. For example, STA 30(1) comprises a plurality of antennas 32(1)-32(L) and STA 30(P) comprises a plurality of antennas 32(1)-32(Z).

The AP 10 is configured to simultaneously transmit from its antennas 12(1)-12(N) multiple signal streams, also called spatial streams, to a STA, e.g., to STA 30(1). A STA may also be configured to simultaneously transmit multiple spatial streams to the AP 10. According to the techniques described herein, the AP 10 is configured to map the spatial streams to corresponding modes of the wireless channel between the plurality of antennas of the STA, e.g., antennas 32(1)-32(L) and the plurality of antennas 12(1)-12(N) of the AP 10, so as to allocate or distribute power unequally to the plurality of modes. The AP 10 performs this power allocation technique when transmitting to each STA. Likewise, while the power allocation techniques are described herein as being performed by the AP 10 when transmitting to a STA, they can be performed by a STA when transmitting to the AP 10. In general, these power allocation techniques may be employed by any wireless communication device when sending multiple spatial streams using MIMO techniques to another wireless communication device.

Figure 2:
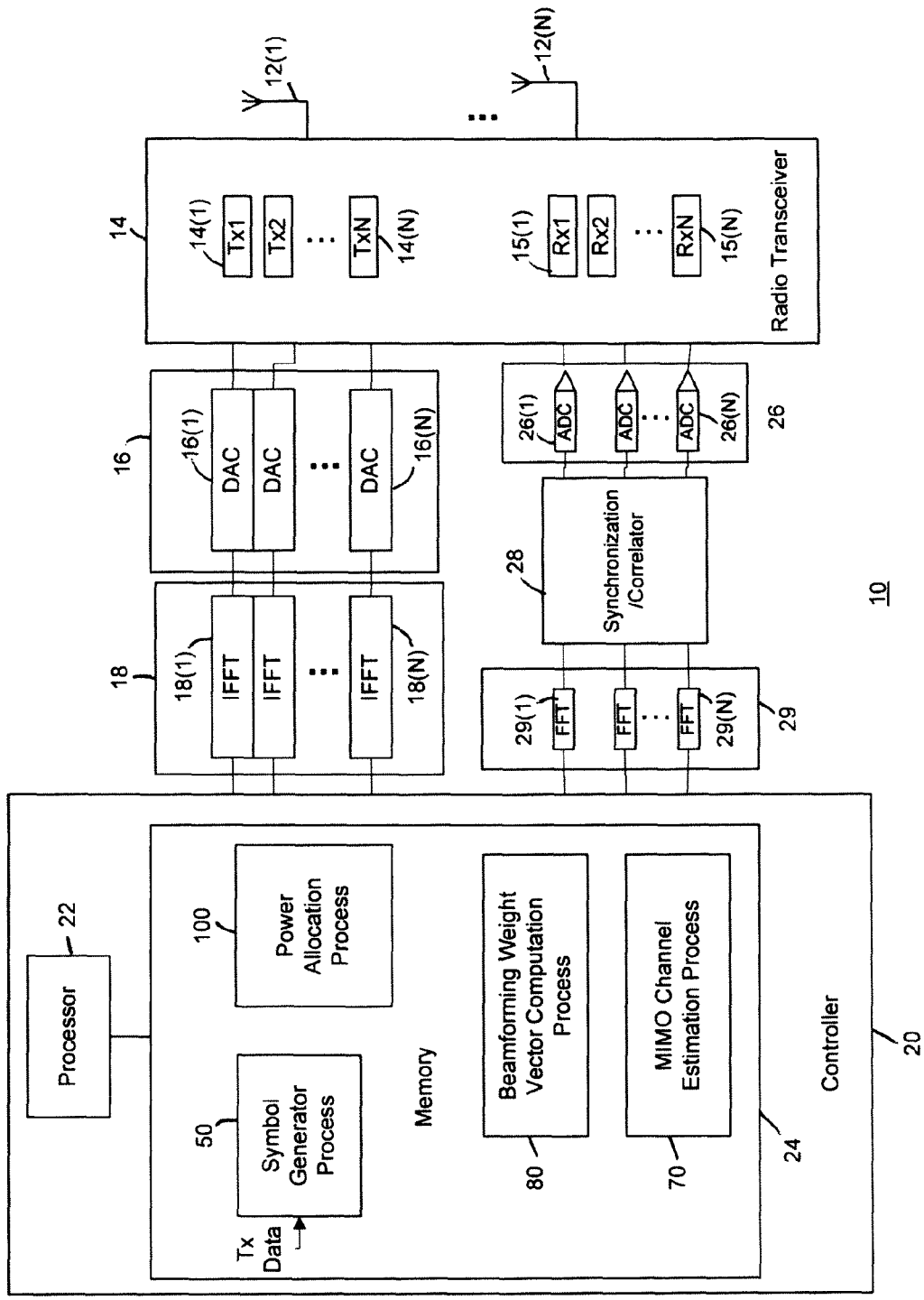
FIG. 2 is an example of a block diagram of the first wireless communication device that is configured to allocate power among multiple spatial streams for transmission to a second wireless communication device.

Reference is now made to FIG. 2. FIG. 2 illustrates a block diagram of a wireless communication device configured to perform the aforementioned power allocation process. The device, e.g., AP 10, comprises the plurality of antennas 12(1)-12(N), a radio transceiver 14 comprising a plurality of transmitters (Tx's) 14(1)-14(N), a block 16 of digital-to-analog converters (DACs) 16(1)-16(N), a block 18 of Inverse Fast Fourier Transform (IFFT) modules 18(1)-18(N) and a controller 20. The transmitters 14(1)-14(N) are configured to upconvert analog transmit signals supplied by the DACs 18(1)-18(N) for transmission by corresponding antennas 12(1)-12(N). There is a block of radio receivers 15(1)-15(N) in the radio transceiver 14, a synchronization/correlator block 28, and a block 29 of analog-to-digital converters (ADCs) 26(1)-26(N) that convert antenna-specific receive signals output from the radio transceiver 14 to digital signals and a block 29 of FFT modules 29(1)-29(N) that convert the antenna-specific digital signals to frequency domain data for analysis and recover of data, etc.

Each transmitter 14(1)-14(N) supplies a transmit signal to a corresponding one of the antennas 12(1)-12(N). Similarly, each receiver 15(1)-15(N) receives a signal detected by a corresponding one of the antennas 12(1)-12(N). The physical alignment in FIG. 2 of the transmitters 14(1)-14(N) and receivers 15(1)-15(N) with respect to the antennas 12(1)-12(N) is not intended to indicate any functional relationship.

The controller 20 comprises a processor 22 and a memory 24. The memory 24 is random access memory, for example, that stores or is encoded with instructions that, when executed by the processor, cause the processor to perform a symbol generator process 50, a MIMO channel estimation process 70, a beamforming weight vector computation process 80 and a power allocation process 100.

The symbol generator process 50 receives transmit data as input and generates corresponding modulation symbols. The MIMO channel estimation process 70 generates a channel estimate or response matrix from FFT data derived from the received signals. The beamforming weight vector computation process 80 computes transmit beamforming weight vectors by decomposing the channel estimate information using singular value decomposition or eigenvector/eigenvalue decomposition, for example. The power allocation process 100 modifies the transmit beamforming weight vectors and maps the spatial streams to corresponding ones of a plurality of modes (e.g., eigenmodes) of the wireless channel and in so doing allocates power to the plurality of modes unequally. The power allocation process 100 allocates power from the stronger modes to weaker modes, but subject to a limit or maximum amount of power allocated to the weaker modes. The power allocation process 100 is described in detail hereinafter with reference to FIGS. 3-5.

The symbol generator process 50, in another form, may be implemented by a separate hardware block instead of as a process executed by the processor 22. Conversely, the IFFT block 18 may be implemented by instructions stored in memory 24 that are executed by the processor 20.

The processes described herein (including the symbol generator process 50, channel estimation process 70, beamforming weight vector computation process 80, power allocation process 100, the IFFT block 18 and the IFFT block 29) may be implemented with logic in any of a variety of forms, so as to be encoded in one or more tangible media for execution. For example, the logic may be in the form of software code instructions stored in a tangible processor or computer readable medium, e.g., memory 24, that, when executed by a processor 22, cause the processor 22 to perform the operations described herein. In another example, the logic may be in the form of digital logic gates, a programmable gate array device or other programmable or fixed logic device, configured to perform the functions described herein.

The channel estimate process 70 generates a channel estimate or response matrix H from received signals. Numerous techniques are known for computing the channel estimate matrix H. For example, many wireless communication protocols, such as IEEE 802.11n, set forth techniques to be used to compute a channel estimate from a received transmission at a plurality of antennas. The beamforming weight vector computation process 80 generates beamforming weight vectors from the channel estimate using singular value decomposition or eigenvalue decomposition of a channel response matrix H.

In general, the receive signal-to-noise ratio (SNR) (at a destination device) of a given spatial stream mapped to the transmitters of the AP 10 by a given beamforming vector is represented by the singular values which are the diagonal elements of the matrix D in the relationship:

$$H_k^H H_k = UDV^H$$

$$S_k^{BF} = \begin{bmatrix} V_{1,1} & V_{1,2} & \cdots & V_{1,Nss} \\ V_{2,1} & V_{2,2} & \cdots & V_{2,Nss} \\ \vdots & \vdots & \ddots & \vdots \\ V_{N,1} & V_{N,2} & \cdots & V_{N,nSS} \end{bmatrix}_k \begin{bmatrix} s_1 \\ s_2 \\ \vdots \\ s_{nSS} \end{bmatrix}_k$$

$$D = \begin{bmatrix} d_1 & 0 & \cdots & 0 \\ 0 & d_2 & \cdots & 0 \\ \vdots & \vdots & \ddots & \vdots \\ 0 & 0 & \cdots & d_{nSS} \end{bmatrix}_k$$

where k is a subcarrier index, $^H$ denotes the conjugate transpose or Hermitian operation, nSS represents the number of spatial streams to be transmitted, N represents the number of transmit chains (transmit antennas) of the AP device 10, H is the estimate of the downlink channel (the aforementioned channel matrix), $s_n$ are the spatial stream values for a given subcarrier, U and V are the left and right unitary matrices of the channel matrix H and D is the diagonal singular value matrix of the channel that is computed by the process 80. In other words, the vector $$\begin{bmatrix} s_1 \\ s_2 \\ \vdots \\ s_{nSS} \end{bmatrix}_k$$

represents values of the signal streams $s_1$-$s_{nSS}$ at subcarrier k. When eigenvalue decomposition is employed, the diagonal elements of the matrix D are eigenvalues. In an orthogonal frequency division multiplexed (OFDM) system, such as that used in IEEE 802.11n systems, the matrices V and D are computed at each of a plurality of subcarriers as indicated by the subcarrier index k in the above notation.

Assuming that the diagonal elements of the D matrix are all non-zero, to fully equalize the receive SNR of all spatial streams, the square-root of the inverse of D is right-hand multiplied to the matrix V so that:

$$S_k^{BF,IPA} = c_k \begin{bmatrix} V_{1,1} & V_{1,2} & \cdots & V_{1,Nss} \\ V_{2,1} & V_{2,2} & \cdots & V_{2,Nss} \\ \vdots & \vdots & \ddots & \vdots \\ V_{N,1} & V_{N,2} & \cdots & V_{N,nSS} \end{bmatrix}_k \sqrt{\begin{bmatrix} d_1 & 0 & \cdots & 0 \\ 0 & d_2 & \cdots & 0 \\ \vdots & \vdots & \ddots & \vdots \\ 0 & 0 & \cdots & d_{nSS} \end{bmatrix}_k^{-1}} \begin{bmatrix} s_1 \\ s_2 \\ \vdots \\ s_{nSS} \end{bmatrix}_k$$

where $c_k$ is a constant used to normalize the transmit power, i.e., $$c_k = \frac{1}{\sum \frac{1}{\sqrt{d_n}}}.$$

The product of the matrix V and the matrix D (at a given subcarrier k) is a transmit beamforming weight matrix that is applied to values of the signal (spatial) streams $s_1$ to $s_{nSS}$ at the subcarrier k.

Figure 3:
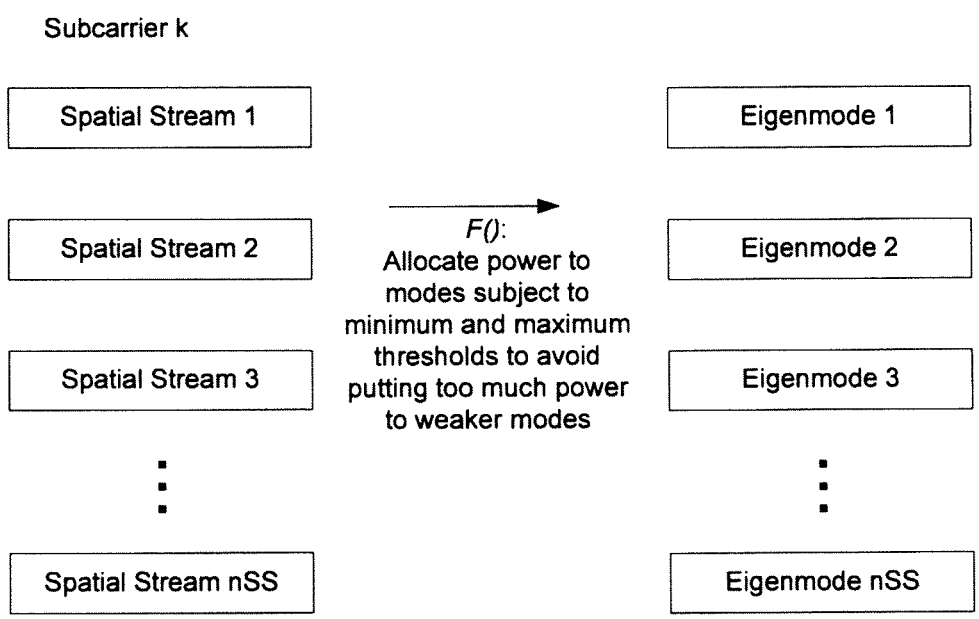
FIG. 3 is a diagram illustrating one aspect of the power allocation process that is configured to prevent allocating too much power to weaker modes of a wireless channel.

For many channels, fully equalizing the receive SNR of the spatial streams is not feasible because the weaker modes of the channel are too weak to be salvaged by redistributing power from the stronger modes. In another situation, the channel has not been "sounded" (with downlink/uplink sounding signals) to the number transmitted spatial streams, and some of the singular values are zero (which means the other spatial streams will be zeroed out along with them). Consequently, according to the techniques described herein, the power allocation process 100 is configured to impose limitations on applying power in order to avoid nulling out a subcarrier across all spatial streams. The power allocation process 100 makes a modification to the D matrix, such that the application of the transmit beamforming weight matrix to the signal streams is according to the computation:

$$S_k^{BF,PA} = c_k \begin{bmatrix} V_{1,1} & V_{1,2} & \cdots & V_{1,Nss} \\ V_{2,1} & V_{2,2} & \cdots & V_{2,Nss} \\ \vdots & \vdots & \ddots & \vdots \\ V_{N,1} & V_{N,2} & \cdots & V_{N,nSS} \end{bmatrix}_k \sqrt{\begin{bmatrix} F(d_1) & 0 & \cdots & 0 \\ 0 & F(d_2) & \cdots & 0 \\ \vdots & \vdots & \ddots & \vdots \\ 0 & 0 & \cdots & F(d_{nSS}) \end{bmatrix}_k^{-1}} \begin{bmatrix} s_1 \\ s_2 \\ \vdots \\ s_{nSS} \end{bmatrix}_k$$

where $F(d_n) = \max(\min(d_n, \epsilon_{max}), \epsilon_{min})$, $$\hat{c}_k = \frac{1}{\sqrt{\sum \frac{1}{F(d_n)}}},$$

and $\epsilon_{min}$ and $\epsilon_{max}$ are minimum and maximum thresholds for the singular values or eigenvalues in the D matrix. In other words, the function F( ) in the D matrix serves to put limits on how much power is assigned to weaker eigenmodes of the channel and in so doing limits the amount of power redistributed from the stronger modes to the weaker modes for a given subcarrier k. This is also depicted in FIG. 3 for spatial streams 1-nSS (at a given subcarrier k) and eigenmodes 1-nSS. The modification to the D matrix above serves to distribute power unequally to the plurality of modes and more specifically limits how much power is redistributed from stronger modes to weaker modes of the wireless channel between the plurality of antennas of the AP and the plurality of antennas of the STA to which the AP is sending the transmission.

Cyclic Mapping of Spatial Streams to Eigenmodes of the Channel

It is common to map the first spatial stream to the strongest mode of the channel, the second spatial stream to the second strongest mode of the channel, and so on. This continues down to the last spatial stream which is always mapped to the weakest mode of the channel.

Figure 4:
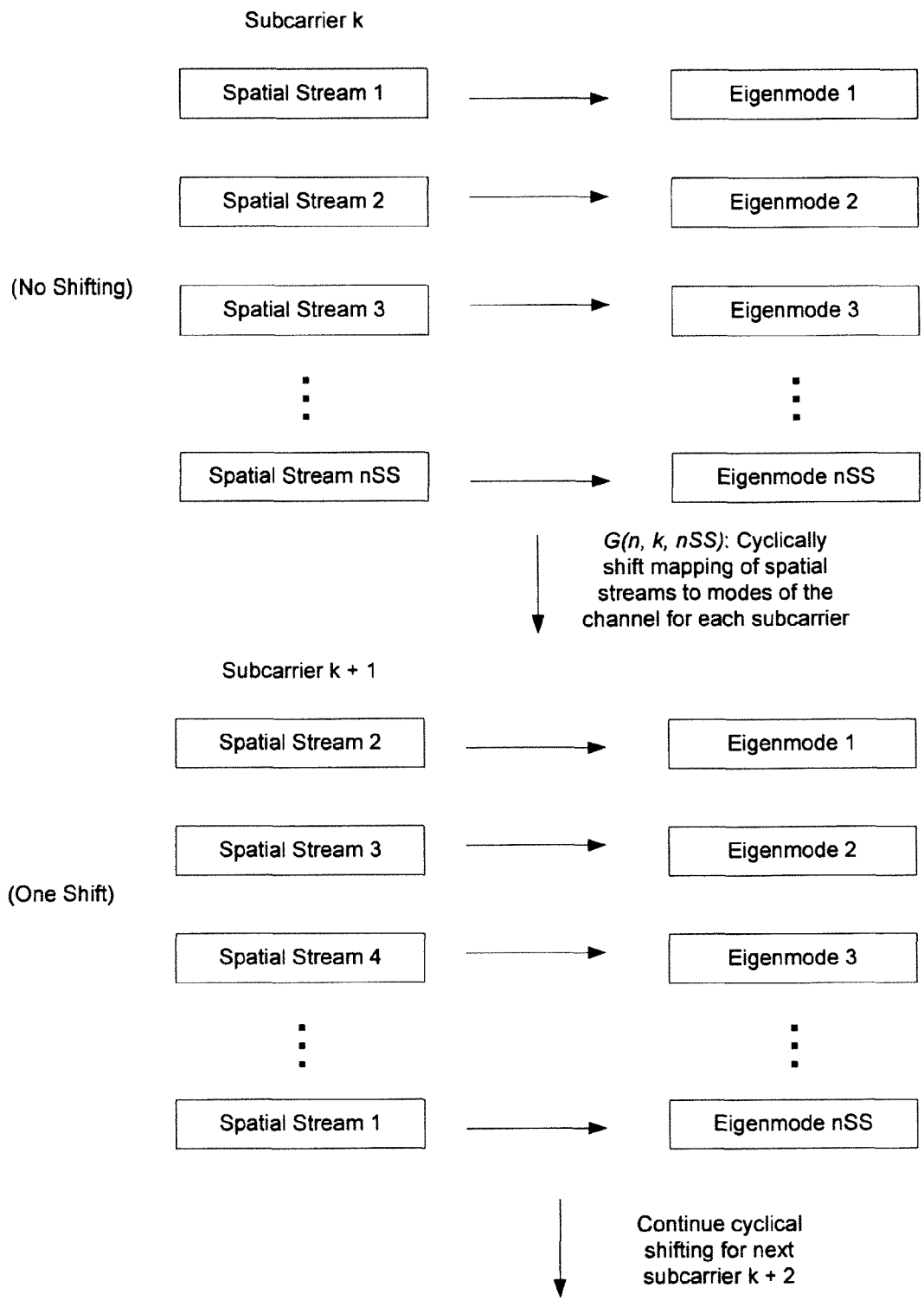
FIG. 4 is a diagram illustrating another aspect of the power allocation process that is configured to cyclically shift the mapping of spatial streams to modes of the wireless channel.

Since the receive SNR is only partially equalized for the spatial streams, according to a second aspect of the power allocation process 100, the mapping of the spatial streams to the beamforming modes of the channel is cyclically shifted or switched to ensure that the last spatial stream is not always the weakest. This cyclic switching or shifting of the spatial stream mapping to eigenmodes is represented by the computation:

$$S_k^{BF,PA} = c_k \begin{bmatrix} V_{1,1} & V_{1,2} & \cdots & V_{1,Nss} \\ V_{2,1} & V_{2,2} & \cdots & V_{2,Nss} \\ \vdots & \vdots & \ddots & \vdots \\ V_{nTx,1} & V_{nTx,2} & \cdots & V_{nTx,nSS} \end{bmatrix}_k$$

$$\sqrt{\begin{bmatrix} F(d_1) & 0 & \cdots & 0 \\ 0 & F(d_2) & \cdots & 0 \\ \vdots & \vdots & \ddots & \vdots \\ 0 & 0 & \cdots & F(d_{nSS}) \end{bmatrix}_k^{-1}} \begin{bmatrix} s_{G(1,k,nSS)} \\ s_{G(2,k,nSS)} \\ \vdots \\ s_{G(nSS,k,nSS)} \end{bmatrix}_k$$

$$F(d_n) = \max(\min(d_n, \varepsilon_{max}), \varepsilon_{min})$$

$$G(n, k, nSS) = \mathrm{mod}(n + k - 2, nSS) + 1$$

where G(n, k, nSS) is a mapping function that shifts the mapping of the spatial streams to the modes of the channel for each subcarrier, and $\epsilon_{min}$ and $\epsilon_{max}$ are minimum and maximum thresholds for the singular values or eigenvalues. The operation of the function G(n, k, nSS) is depicted in FIG. 4 and involves cyclically shifting a mapping of the signal (spatial) streams to modes of the wireless channel for each of a plurality of subcarriers of each signal stream. Another way to achieve the same function is to rotate (cyclically shift) the columns of the V matrix.

Figure 5:
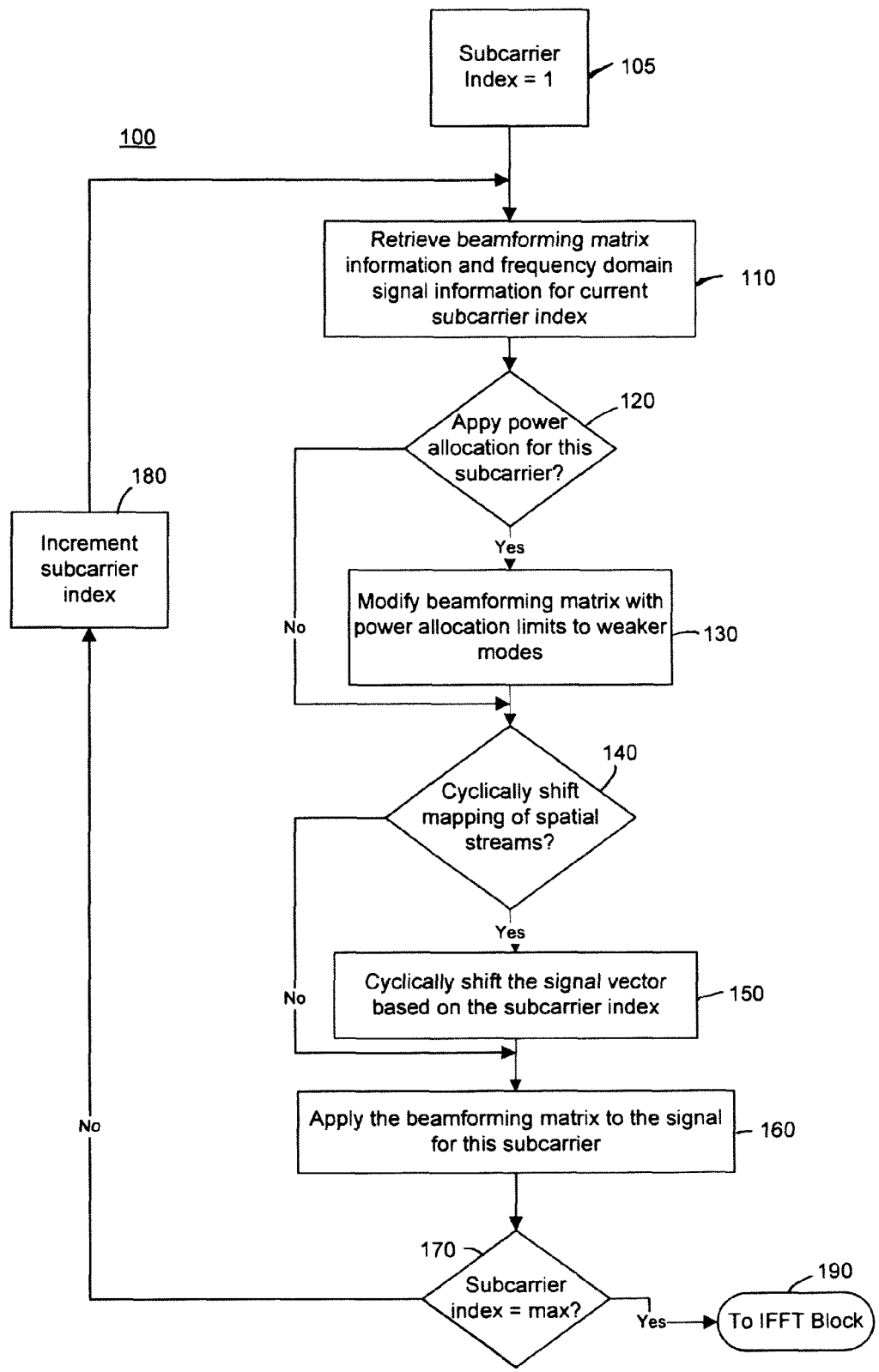
FIG. 5 is an example of a flow chart depicting the power allocation process.

Turning now to FIG. 5, a flow chart for the power allocation logic 100 is now described. When a downlink frame is ready for transmission, then at 105, the subcarrier index is initialized to 1. At 110, the beamforming information (the V matrix and the D matrix), and the frequency domain signal information for the current subcarrier index is retrieved. At 120, it is determined whether to apply the power allocation schemes described herein in connection with FIG. 3 for the current subcarrier. For certain circumstances, it may be desirable not to execute these schemes for all subcarriers.

If it is determined at 120 that the power allocation schemes of FIG. 3 is to be performed for the current subcarrier, then at 130, the D matrix is modified as described above, where minimum and maximum thresholds are placed on the singular values for the modes at each subcarrier so as to limit how much power is redistributed from the stronger modes to the weaker modes of the channel. Thus, operation 130 involves generating the transmit beamforming weight matrix (V multiplied by D) so as to limit an amount of power allocated to weaker modes of the channel, such as by allocating power for each mode as a function of minimum and maximum thresholds for the eigenvalue or singular value for each of the corresponding modes.

At 140, a determination is made as to whether to invoke the cyclical shifting/mapping of the spatial streams to the eigenmodes as described above in connection with FIG. 4. If the cyclic shifting is to be invoked, then at 150, the signal vector S is rotated or shifted for the current subcarrier index, such as according to the function G(n, k, nSS) described above. Then, at 160, the beamforming matrix V is applied to the shifted or rotated signal vector S. Alternatively, the columns of the V matrix are shifted or rotated rather than shifting or rotating the signal vector S.

At 160, when operation 130 is to be performed but operation 150 is not performed, then the transmit beamforming weight matrix so generated and applied to the signal streams is represented as $$\hat{c}_k V \sqrt{\begin{bmatrix} F(d_1) & 0 & \cdots & 0 \\ 0 & F(d_2) & \cdots & 0 \\ \vdots & \vdots & \ddots & \vdots \\ 0 & 0 & \cdots & F(d_{nSS}) \end{bmatrix}_k^{-1}}$$

where V is a right unitary matrix of a channel matrix for the wireless channel, $F(d_n) = \max(\min(d_n, \epsilon_{max}), \epsilon_{min})$, where $d_n$ is an eigenvalue or singular value for a corresponding mode of the wireless channel, $\epsilon_{min}$ and $\epsilon_{max}$ are minimum and maximum thresholds for the singular values or eigenvalues, $$\hat{c}_k = \frac{1}{\sqrt{\sum \frac{1}{F(d_n)}}}$$

is a normalization factor. This matrix is applied to the signal streams vector at a given subcarrier k as described above.

When operations 130 and 150 are to be performed at a given subcarrier, then the resulting computation is represented by the computation:

$$c'_k V \sqrt{\begin{bmatrix} F(d_1) & 0 & \cdots & 0 \\ 0 & F(d_2) & \cdots & 0 \\ \vdots & \vdots & \ddots & \vdots \\ 0 & 0 & \cdots & F(d_{nSS}) \end{bmatrix}^{-1}_k \begin{bmatrix} s_{G(1,k,nSS)} \\ s_{G(2,k,nSS)} \\ \vdots \\ s_{G(nSS,k,nSS)} \end{bmatrix}_k},$$

where G(n, k, nSS)=mod(n+k−2, nSS)+1.

At 170, it is determined whether the current subcarrier is the last (max) subcarrier in the subchannel for the modulation scheme employed. If not, then the process repeats after the subcarrier index is incremented at 180. Otherwise, if it is the last subcarrier, then at 190, the data is output to the IFFT block 18.

The techniques described herein ensure that signals sent on different spatial streams have the same receive SNR at the destination device, thereby reducing frame error rates and improving the downlink to that destination device.

Thus, based on the foregoing, a method is provided comprising generating a plurality of signal streams to be simultaneously transmitted from a plurality of antennas of a first wireless communication device to a second wireless communication device having a plurality of antennas; applying a transmit beamforming weight matrix to the plurality of signal streams to map each signal stream to a corresponding one of a plurality of modes of a wireless channel between the plurality of antennas of the first wireless communication device and the plurality of antennas of the second wireless communication device and so as to allocate power unequally to the plurality of modes; and simultaneously transmitting a plurality of beamformed signals resulting from application of the transmit beamforming weight matrix to the plurality of signal streams.

The above description is intended by way of example only.

What is claimed is:

1. A method comprising:
generating a plurality of signal streams to be simultaneously transmitted from a plurality of antennas of a first wireless communication device to a second wireless communication device having a plurality of antennas;
applying a transmit beamforming weight matrix to the plurality of signal streams to map each signal stream to a corresponding one of a plurality of modes of a wireless channel between the plurality of antennas of the first wireless communication device and the plurality of antennas of the second wireless communication device, wherein the beamforming matrix includes minimum and maximum thresholds for an eigenvalue or singular value for each of the corresponding modes so as to allocate power unequally to the plurality of modes and to limit an amount of power redistributed from stronger modes of the plurality of modes to weaker modes of the plurality of modes; and
simultaneously transmitting a plurality of beamformed signals resulting from application of the transmit beamforming weight matrix to the plurality of signal streams.

2. The method of claim 1, and further comprising selecting the minimum and maximum thresholds to avoid nulling out a subcarrier across all modes.

3. The method of claim 1, wherein the applying the transmit beamforming weight matrix comprises computing:

$$c'_k V \sqrt{\begin{bmatrix} F(d_1) & 0 & \cdots & 0 \\ 0 & F(d_2) & \cdots & 0 \\ \vdots & \vdots & \ddots & \vdots \\ 0 & 0 & \cdots & F(d_{nSS}) \end{bmatrix}^{-1}_k},$$

where V is a right unitary matrix of a channel matrix for the wireless channel, $F(d_n)=\max(\min(d_n,\epsilon_{max}),\epsilon_{min})$, where $d_n$ is an eigenvalue or singular value for a corresponding mode of the wireless channel, $\epsilon_{min}$ and $\epsilon_{max}$ are the minimum and maximum thresholds for the singular values or eigenvalues, $$c'_k = \frac{1}{\sqrt{\sum \frac{1}{F(d_n)}}}$$

is a normalization factor for a given subcarrier k and nSS is the number of the plurality of signals streams, and wherein applying the transmit beamforming matrix to the plurality of signal streams comprises computing $$c'_k V \sqrt{\begin{bmatrix} F(d_1) & 0 & \cdots & 0 \\ 0 & F(d_2) & \cdots & 0 \\ \vdots & \vdots & \ddots & \vdots \\ 0 & 0 & \cdots & F(d_{nSS}) \end{bmatrix}^{-1}_k \begin{bmatrix} s_1 \\ s_2 \\ \vdots \\ s_{nSS} \end{bmatrix}_k},$$

where $$\begin{bmatrix} s_1 \\ s_2 \\ \vdots \\ s_{nSS} \end{bmatrix}_k$$

represents values of the signal streams $s_1$-$s_{nSS}$ at the subcarrier k.

4. The method of claim 3, wherein the applying further comprises cyclically shifting a mapping of the signal streams to the modes of the wireless channel for a plurality of subcarriers of the signal streams according to the computation:

$$c'_k V \sqrt{\begin{bmatrix} F(d_1) & 0 & \cdots & 0 \\ 0 & F(d_2) & \cdots & 0 \\ \vdots & \vdots & \ddots & \vdots \\ 0 & 0 & \cdots & F(d_{nSS}) \end{bmatrix}^{-1}_k \begin{bmatrix} s_{G(1,k,nSS)} \\ s_{G(2,k,nSS)} \\ \vdots \\ s_{G(nSS,k,nSS)} \end{bmatrix}_k},$$

where G(n,k,nSS)=mod(n+k−2,nSS)+1 wherein G(n,k,nSS) is a mapping function; and wherein n is an integer.

5. The method of claim 1, wherein the applying further comprises cyclically shifting a mapping of the signal streams to the modes of the wireless channel for a plurality of subcarriers of each signal stream.

6. The method of claim 1, wherein the applying is performed for each of a plurality of subcarriers of the signal streams.

7. An apparatus comprising:

a plurality of antennas;

a plurality of radio transmitters each associated with a corresponding one of the plurality of antennas, each transmitter configured to upconvert a corresponding transmit signal supplied as input thereto;

a controller configured to be coupled to the plurality of radio transmitters, wherein the controller is configured to:

generate a plurality of signal streams to be simultaneously transmitted by the plurality of transmitters via the plurality of antennas to a destination wireless communication apparatus;

apply a transmit beamforming weight matrix to the plurality of signal streams to map each signal stream to a corresponding one of a plurality of modes of a wireless channel between the plurality of antennas and a plurality of antennas of the destination wireless communication apparatus, wherein the beamforming matrix includes minimum and maximum thresholds for an eigenvalue or singular value for each of the corresponding modes so as to allocate power unequally to the plurality of modes and to limit an amount of power redistributed from stronger modes of the plurality of modes to weaker modes of the plurality of modes; and supply to the plurality of transmitters transmit signals resulting from the application of the transmit beamforming weight matrix to the plurality of signal streams.

8. The apparatus of claim 7, wherein the controller is configured to select the minimum and maximum thresholds to avoid nulling out a subcarrier across all modes.

9. The apparatus of claim 7, wherein the controller is configured to apply the transmit beamforming weight matrix by computing $$c'_k V \sqrt{\begin{bmatrix} F(d_1) & 0 & \cdots & 0 \\ 0 & F(d_2) & \cdots & 0 \\ \vdots & \vdots & \ddots & \vdots \\ 0 & 0 & \cdots & F(d_{nSS}) \end{bmatrix}_k^{-1}} \begin{bmatrix} s_1 \\ s_2 \\ \vdots \\ s_{nSS} \end{bmatrix}_k,$$

where V is a right unitary matrix of a channel matrix for the wireless channel, $F(d_n)=\max(\min(d_n,\epsilon_{max}),\epsilon_{min})$, where $d_n$ is an eigenvalue or singular value of the wireless channel, $\epsilon_{min}$ and $\epsilon_{max}$ are the minimum and maximum thresholds for the singular values or eigenvalues, and $$c'_k = \frac{1}{\sqrt{\sum \frac{1}{F(d_n)}}}$$

is a normalizaion factor for a given subcarrier k and nSS is the number of the plurality of signals streams, and the controller is configured to apply the transmit beamforming weight matrix to the signal streams according to the computation:

$$c'_k V \sqrt{\begin{bmatrix} F(d_1) & 0 & \cdots & 0 \\ 0 & F(d_2) & \cdots & 0 \\ \vdots & \vdots & \ddots & \vdots \\ 0 & 0 & \cdots & F(d_{nSS}) \end{bmatrix}_k^{-1}} \begin{bmatrix} s_1 \\ s_2 \\ \vdots \\ s_{nSS} \end{bmatrix}_k,$$

where $$\begin{bmatrix} s_1 \\ s_2 \\ \vdots \\ s_{nSS} \end{bmatrix}_k$$

represents values of the signal streams $s_1$-$s_{nSS}$ at the subcarrier k.

10. The apparatus of claim 9, wherein the controller is configured to apply the transmit beamforming weight matrix to the plurality of signal streams by cyclically shifting a mapping of the signal streams to the modes of the wireless channel for a plurality of subcarriers of the signal streams according to the computation:

$$c'_k V \sqrt{\begin{bmatrix} F(d_1) & 0 & \cdots & 0 \\ 0 & F(d_2) & \cdots & 0 \\ \vdots & \vdots & \ddots & \vdots \\ 0 & 0 & \cdots & F(d_{nSS}) \end{bmatrix}_k^{-1}} \begin{bmatrix} s_{G(1,k,nSS)} \\ s_{G(2,k,nSS)} \\ \vdots \\ s_{G(nSS,k,nSS)} \end{bmatrix}_k,$$

where $G(n,k,nSS)=\mod(n+k-2,nSS)+1$ wherein $G(n,k,nSS)$ is a mapping function; and wherein n is an integer.

11. The apparatus of claim 7, wherein the controller is configured to apply the transmit beamforming weight matrix to the plurality of signal streams by cyclically shifting a mapping of the signal streams to the modes of the wireless channel for a plurality of subcarriers of each signal stream.

12. The apparatus of claim 7, wherein the controller is configured to apply the transmit beamforming weight matrix to the plurality of signal streams at each of a plurality of subcarriers of the signal streams.

13. A non-transitory computer readable medium storing instructions that, when executed by a processor, cause the processor to:

generate a plurality of signal streams to be simultaneously transmitted by a plurality of transmitters via the plurality of antennas to a destination wireless communication apparatus;

apply a transmit beamforming weight matrix to the plurality of signal streams to map each signal stream to a corresponding one of a plurality of modes of a wireless channel between the plurality of antennas and a plurality of antennas of the destination wireless communication apparatus, wherein the beamforming matrix includes minimum and maximum thresholds for an eigenvalue or singular value for each of the corresponding modes so as to allocate power unequally to the plurality of modes and to limit an amount of power redistributed from stronger modes of the plurality of modes to weaker modes of the plurality of modes; and supply to the plurality of transmitters transmit signals resulting from the application of the transmit beamforming weight matrix to the plurality of signal streams.

14. The computer readable medium of claim 13, and further comprising instructions that cause the processor to select the minimum and maximum thresholds to avoid nulling out a subcarrier across all modes.

15. The computer readable medium of claim 14, wherein the instructions that cause the processor to apply the transmit beamforming weight matrix comprise instructions that cause the processor to computing $$c'_k V \sqrt{\begin{bmatrix} F(d_1) & 0 & \cdots & 0 \\ 0 & F(d_2) & \cdots & 0 \\ \vdots & \vdots & \ddots & \vdots \\ 0 & 0 & \cdots & F(d_{nSS}) \end{bmatrix}_k^{-1} \begin{bmatrix} s_1 \\ s_2 \\ \vdots \\ s_{nSS} \end{bmatrix}_k},$$

where V is a right unitary matrix of a channel matrix for the wireless channel, $F(d_n) = \max(\min(d_n, \epsilon_{max}), \epsilon_{min})$, where $d_n$ is an eigenvalue or singular value of the wireless channel, $\epsilon_{min}$ and $\epsilon_{max}$ are the minimum and maximum thresholds for the singular values or eigenvalues, and $$c'_k = \frac{1}{\sum_j \frac{1}{F(d_n)}}$$

is a normalization factor for a given subcarrier k and nSS is the number of the plurality of signals streams, and wherein the instructions that cause the processor to apply the transmit beamforming weight matrix to the signal streams comprises instructions that cause the processor to compute $$c'_k V \sqrt{\begin{bmatrix} F(d_1) & 0 & \cdots & 0 \\ 0 & F(d_2) & \cdots & 0 \\ \vdots & \vdots & \ddots & \vdots \\ 0 & 0 & \cdots & F(d_{nSS}) \end{bmatrix}_k^{-1} \begin{bmatrix} s_1 \\ s_2 \\ \vdots \\ s_{nSS} \end{bmatrix}_k},$$

where $$\begin{bmatrix} s_1 \\ s_2 \\ \vdots \\ s_{nSS} \end{bmatrix}_k$$

represents values of the signal streams $s_1$-$s_{nSS}$ at the subcarrier k.

16. The computer readable medium of claim 15, wherein the instructions that cause the processor to apply the transmit beamforming weight matrix comprises instructions that cause the processor to cyclically shifting a mapping of the signal streams to the modes of the wireless channel for a plurality of subcarriers of the signal streams according to the computation:

$$c'_k V \sqrt{\begin{bmatrix} F(d_1) & 0 & \cdots & 0 \\ 0 & F(d_2) & \cdots & 0 \\ \vdots & \vdots & \ddots & \vdots \\ 0 & 0 & \cdots & F(d_{nSS}) \end{bmatrix}_k^{-1} \begin{bmatrix} s_{G(1,k,nSS)} \\ s_{G(2,k,nSS)} \\ \vdots \\ s_{G(nSS,k,nSS)} \end{bmatrix}_k},$$

where $G(n,k,nSS) = \mod(n+k-2, nSS)+1$ wherein $G(n,k,nSS)$ is a mapping function; and wherein n is an integer.

17. The computer readable medium of claim 13, wherein the instructions that cause the processor to apply the transmit beamforming weight matrix comprise instructions that cause the processor to apply the transmit beamforming weight matrix to the plurality of signal streams by cyclically shifting a mapping of the signal streams to the modes of the wireless channel for a plurality of subcarriers of each signal stream.

* * * * *